(12) United States Patent
Teraoka

(10) Patent No.: US 7,455,612 B2
(45) Date of Patent: Nov. 25, 2008

(54) ROTATIVELY DRIVING APPARATUS

(75) Inventor: Masao Teraoka, Tochigi (JP)

(73) Assignee: Tochigi Fuji Sangyo Kabushiki Kaisha, Tochigi-ken (JP)

( * ) Notice: Subject to any disclaimer, the term of this patent is extended or adjusted under 35 U.S.C. 154(b) by 318 days.

(21) Appl. No.: 11/066,921

(22) Filed: Feb. 25, 2005

(65) Prior Publication Data
US 2005/0187058 A1  Aug. 25, 2005

(30) Foreign Application Priority Data
Feb. 25, 2004  (JP) ............................ 2004-049157

(51) Int. Cl.
*F16H 37/06* (2006.01)
(52) U.S. Cl. .......................... 475/151; 475/5; 180/65.2
(58) Field of Classification Search .............. 475/5, 475/200, 202, 300, 149, 151; 180/242, 243, 180/65.2, 65.3, 65.6
See application file for complete search history.

(56) References Cited

U.S. PATENT DOCUMENTS

| | | | |
|---|---|---|---|
| 4,309,620 A | * | 1/1982 | Bock ........................ 290/4 R |
| 5,433,282 A | * | 7/1995 | Moroto et al. ............. 180/65.2 |
| 6,033,337 A | | 3/2000 | Ohkuma et al. |
| 6,880,664 B2 | * | 4/2005 | Pecnik et al. ............... 180/243 |
| 7,222,686 B2 | * | 5/2007 | Perrin ........................ 180/65.2 |

FOREIGN PATENT DOCUMENTS

| | | |
|---|---|---|
| DE | 3730653 | 3/1988 |
| DE | 102 55 727 | 10/2003 |
| JP | 63-71426 | 3/1988 |
| JP | 9-298802 | 11/1997 |

OTHER PUBLICATIONS

English Patent Abstract of JP-63-071426 from esp@cenet.
German Office Action for Patent Application No. 10 2005 008 525. 3-14, dated Aug. 13, 2007, and English translation thereof, 6 pages.

* cited by examiner

*Primary Examiner*—Roger Pang
*Assistant Examiner*—Derek D Knight
(74) *Attorney, Agent, or Firm*—Osha•Liang LLP (57) ABSTRACT

A rotatively driving apparatus includes: a differential rotation amplification mechanism for amplifying differential rotation between a rotating shaft and a drive pinion shaft which are relatively rotatable; a rotor interlockingly rotatable with a amplified differential rotation amplified; and a rotation controlling mechanism for controlling the rotation of the rotor. The rotation controlling mechanism includes a stator for constituting an electric motor together with the rotor, a variable resistor for absorbing electric energy generated by the electric motor by the rotation of the rotor, and a controller for controlling torque transmitted between the rotating shaft and the drive pinion shaft by adjusting the energy absorbed by the variable resistor. The differential rotation amplification mechanism and the rotor are disposed on an identical axis.

16 Claims, 10 Drawing Sheets

ROTATIVELY DRIVING APPARATUS

The present application claims foreign priority based on Japanese Patent Application No. P.2004-049157, filed on Feb. 25, 2004, the contents of which are incorporated herein by reference.

BACKGROUND OF THE INVENTION

The present invention relates to a rotatively driving apparatus used for such as control of a torque transmission in a four-wheel drive vehicle.

A power transmission apparatus of a related art is mounted in a four-wheel vehicle. In the four-wheel drive vehicle, a propeller shaft is interlocked with a drive system consisting of an engine and a transmission through gears and. Torque is transmitted from the propeller shaft to left and right front wheels and through a front differential gear, and the torque is also transmitted to a differential apparatus. Namely, a drive gear of the differential apparatus is coupled to the propeller shaft.

A driven gear of the differential apparatus is connected to a rear differential gear disposed between left and right rear wheels. Intermediate gears meshing with the drive gear and the driven gear hold a first gear, and the first gear meshes with a second gear. The first gear and the second gear constitute a speed increasing gear set. The second gear is coupled to a rotor of an electric motor. A stator of the electric motor is provided on a vehicle body side, and a variable resistor is connected thereto.

The torque is transmitted from the drive system to the propeller shaft. Meanwhile, the torque is transmitted to the left and right front wheels through the front differential gear. On the other hand, the torque is transmitted from the propeller shaft to the left and right rear wheels through the differential apparatus and the rear differential gear.

The transmission of the torque to the left and right rear wheels is effected from the propeller shaft through the differential apparatus in correspondence with the braking action of the gear by the electric motor corresponding to the relative magnitude of a load resistance of the variable resistor.

Thus, the front wheels serve as main driving wheels, and the rear wheels serve as auxiliary driving wheels for which variable control of the transmitted torque is effected, thereby permitting four-wheel drive running.

With the above related structure, however, the speed increasing gear set (the first and second gears) spanning the two shafts, as well as the electric motor, are offhandedly arranged, and the speed increasing gear set and the electric motor are arranged separately and are supported by the vehicle body side. Therefore, there have been problems in that the apparatus becomes large in size, and that the weight balance between the left and right sides of the four-wheel drive vehicle is deteriorated.

SUMMARY OF THE INVENTION

It is an object of the invention to provide a rotatively driving apparatus wherein an entire apparatus is compactly formed and a weight balance is improved.

In order to achieve the object, the invention provides a rotatively driving apparatus according to embodiments of the present invention comprises a first member; a second member, wherein the first member and the second member are relatively rotatable; a differential rotation amplification mechanism for amplifying a differential rotation between the first member and the second member; a rotor rotatable so as to interlock with an amplified differential rotation amplified by the differential rotation amplification mechanism; and a rotation controlling mechanism for controlling a rotation of the rotor. In the rotatively driving apparatus, a differential rotation amplification mechanism and a rotor are disposed on an identical axis.

Since the differential rotation amplification mechanism and the rotor are disposed on substantially the same axis, the rotatively driving apparatus as a whole can be formed compactly, and is capable of making the weight balance satisfactory.

In a case where the rotation controlling mechanism includes a stator for constituting an electric motor together with the rotor, an energy absorbing device for absorbing electric energy generated by the electric motor by the rotation of the rotor, and a controller for controlling torque transmitted between the two members by adjusting the energy absorbed by the energy absorbing device, the energy absorbed by the energy absorbing device can be adjusted by the controller. Hence, it is possible to control the transmitted torque between the two members.

Moreover, the electric motor and the differential rotation amplification mechanism can be disposed on the same axis, the overall apparatus can be formed compactly, and the weight balance can be made satisfactory.

In a case where the rotation controlling mechanism includes a fastening portion for limiting the rotation of the rotor by a fastening force, and a pump portion which is operated in correspondence with the rotation of the rotor and generates hydraulic pressure for fastening the fastening portion, hydraulic pressure can be generated by the pump portion which is operated in correspondence with the rotation of the rotor. As the fastening portion is fastened by this hydraulic pressure, the torque can be transmitted between the two members.

In a case where the two members are disposed in a torque transmission path to auxiliary driving wheels of a four-wheel drive vehicle in which a torque from a main driving source is transmitted to main driving wheels and the auxiliary driving wheels, and the rotatively driving apparatus controls the transmission of the torque from the main driving source to the auxiliary driving wheels, four-wheel drive running can be performed by the main driving wheels and the auxiliary driving wheels while controlling the transmission of the torque to the auxiliary driving wheels.

In a case where one of the two members is a rotating shaft coupled to a propeller shaft for transmitting the torque from the main driving source, and the other one thereof is a drive pinion shaft which is rotatably supported by a bearing supporting portion of a differential carrier, and the electric motor is disposed on an outer peripheral side of the bearing supporting portion, the electric motor as a whole can be disposed compactly by making use of the space on the outer peripheral side of the bearing supporting portion, and the weight balance in the axial direction can be made satisfactory.

In a case where the rotor is rotatably supported by an outer periphery of the bearing supporting portion by means of a bearing, the rotor can be supported reliably, and control of the rotation of the rotor by the rotation controlling mechanism can be effected accurately.

In a case where the differential rotation amplification mechanism is formed by a pair of gears respectively provided on the two members and having slightly different numbers of teeth, a pinion gear meshing with the gears, and a carrier for rotatably supporting the pinion gear and coupled to the rotor, the differential rotation amplification mechanism can easily be disposed adjacent to the rotor in a direction parallel to the axis of rotation while being made compact.

In a case where the differential rotation amplification mechanism is formed by an internal gear provided on one of the two members, a sun gear provided on the rotor, planetary gears meshing with the internal gear and the sun gear, and a carrier for rotatably supporting the planetary gears and coupled to the other one of the two members, the differential rotation amplification mechanism can easily be disposed adjacent to the rotor in a direction parallel to the axis of rotation while being made compact.

In a case where the rotation controlling mechanism includes a stator constituting an electric motor together with the rotor, a power source capable of supplying electric energy to the electric motor, and a controller for controlling the rotation of the other one of the two members with respect to a fixed one of the two members by adjusting the electric energy supplied from the power source, the rotation of the other one of the two members with respect to the one which is fixed can be controlled under control by the controller.

The four-wheel drive vehicle can be arranged as one having a different driving source in which the other member whose rotation is controlled of the two members transmits torque to auxiliary driving wheels separately from the main driving wheels to which the torque is transmitted from a main driving source.

Further, the rotatively driving apparatus the invention may comprise: a differential rotation amplification mechanism for amplifying differential rotation between two relatively rotatable members in which one is fixed and the other is rotatable; a rotor which is rotatable in such a manner as to be interlocked with the differential rotation amplified by the differential rotation amplification mechanism; and a rotation controlling mechanism for controlling the rotation of the rotor, wherein the differential rotation amplification mechanism and the rotor are accommodated and disposed in a identical casing. Accordingly, the overall apparatus can be formed compactly, and the weight balance can be made satisfactory.

The object of making it possible to form the entire apparatus compactly and improving the weight balance is realized by making effective use of the space.

DESCRIPTION OF THE PREFERRED EMBODIMENTS

First Embodiment

Figure 1:
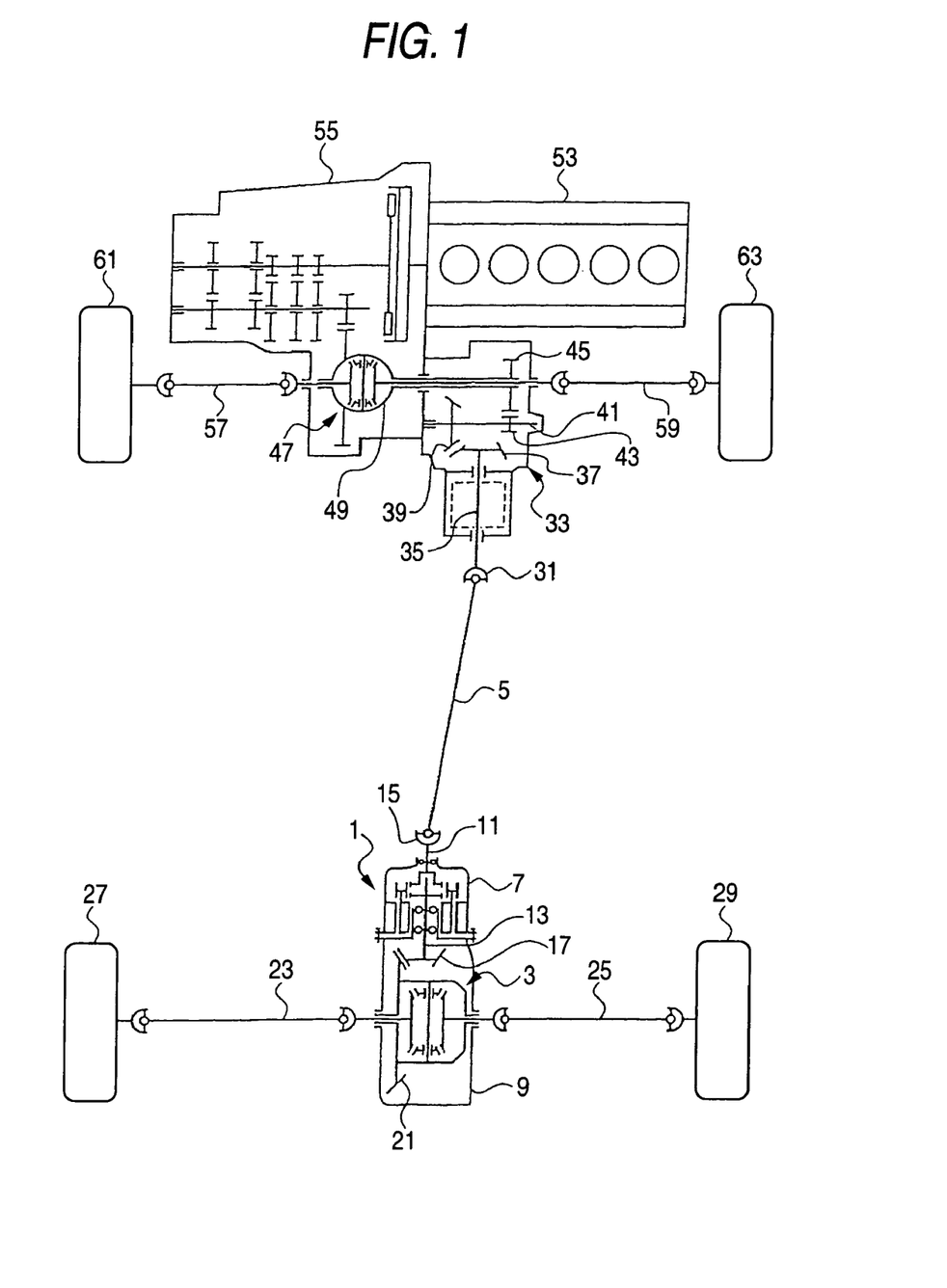
FIG. 1 is a skeleton plan view of a four-wheel drive vehicle (first embodiment)
Figure 2:
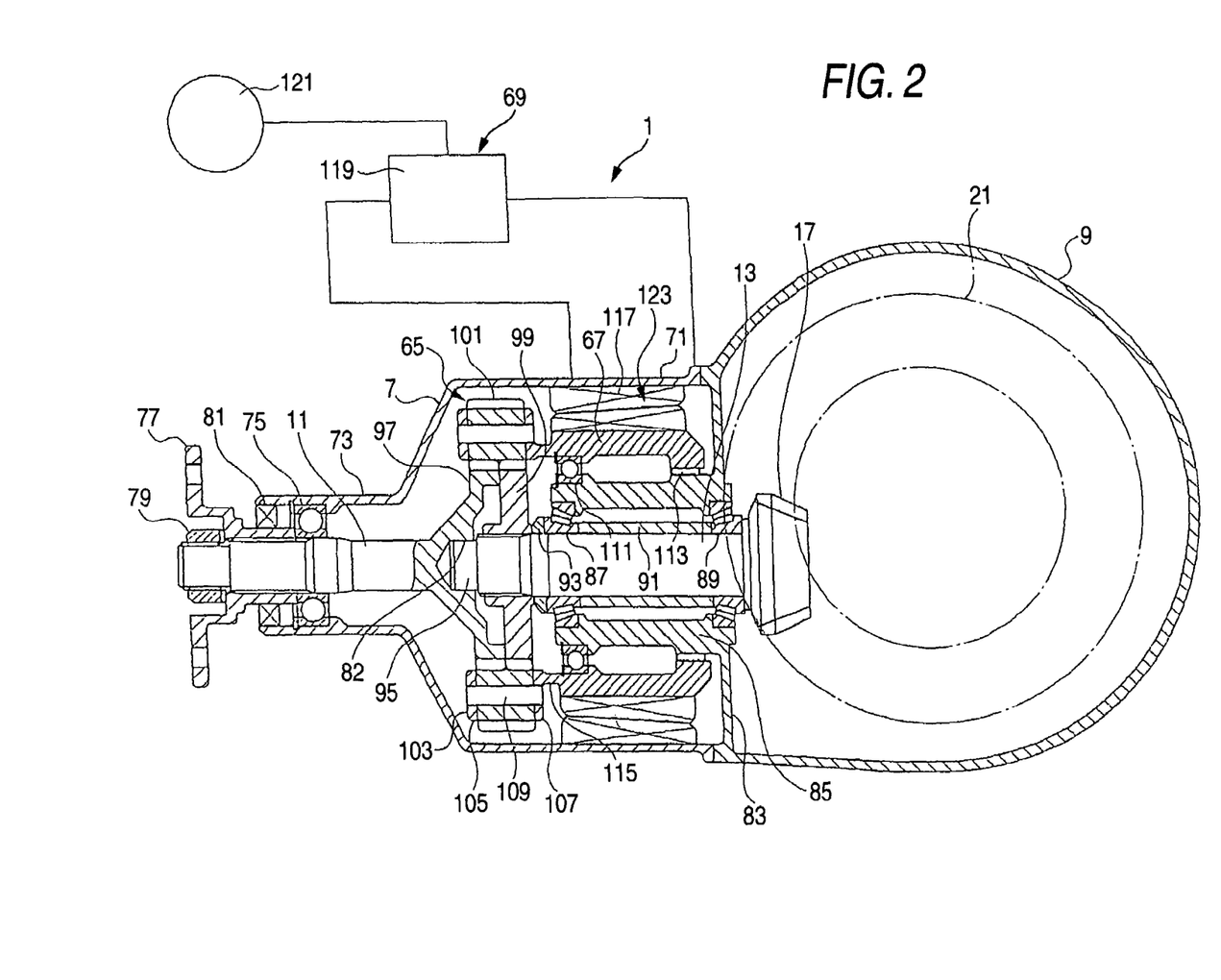
FIG. 2 is an enlarged cross-sectional view illustrating the rotatively driving apparatus and its periphery (first embodiment)
Figure 3:
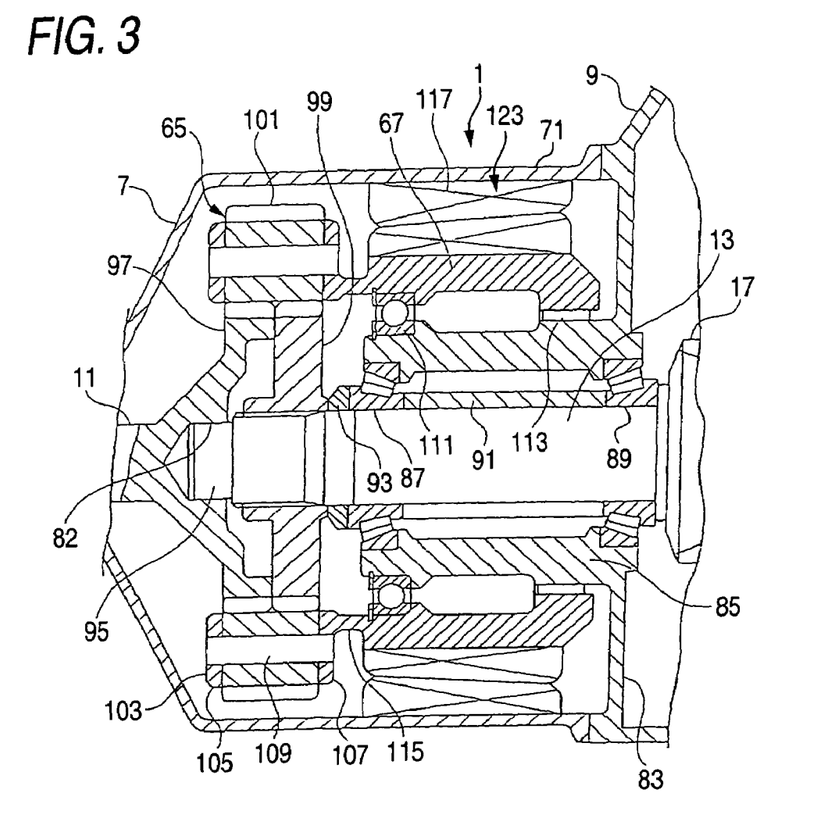
FIG. 3 is an enlarged cross-sectional view of essential portions (first embodiment)
Figure 4:
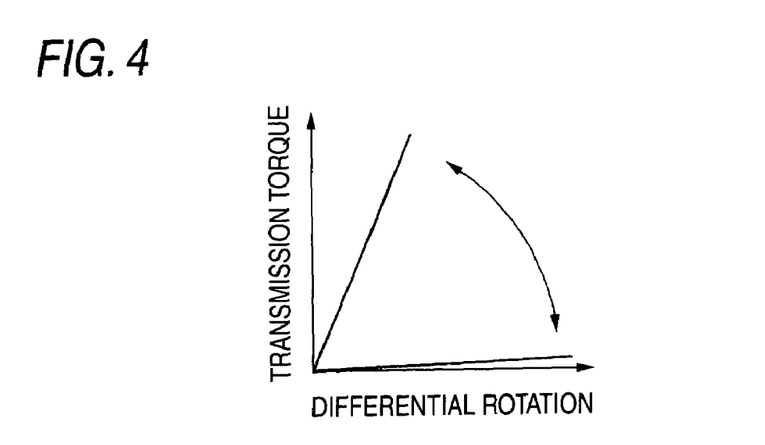
FIG. 4 is a graph illustrating the relationship between the differential rotation and the transmitted torque (first embodiment)

FIGS. 1 to 3 are diagrams illustrating a first embodiment of the invention, in which FIG. 1 is a skeleton plan view of a four-wheel drive vehicle illustrating the arrangement of a rotatively driving apparatus, FIG. 2 is an enlarged cross-sectional view illustrating the rotatively driving apparatus and its periphery, FIG. 3 is an enlarged cross-sectional view of essential portions, and FIG. 4 is a graph illustrating a relationship between a differential rotation and a transmitted torque.

As shown in FIG. 1, a rotatively driving apparatus is disposed between a rear differential gear 3 and a propeller shaft 5 of a four-wheel drive vehicle of a front-engine front-drive base (FF base), in which the engine has a crank shaft extending in lateral direction of the vehicle. The rotatively driving apparatus 1 is disposed in a carrier cover 7 (a casing 7). The carrier cover 7 is mounted on a differential carrier 9.

As two relatively rotatable members both of which rotate, the rotatively driving apparatus 1 has a rotating shaft 11 (a first member 11) and a drive pinion shaft 13 (a second member 13) which are disposed adjacent to each other on the same axis.

The rotating shaft 11 is coupled to the propeller shaft 5 through a constant velocity joint 15 outside the carrier cover 7. The drive pinion shaft 13 has a drive pinion gear 17. The drive pinion gear 17 meshes with a ring gear 21 of the rear differential gear 3. The rear differential gear 3 is interlockingly coupled to left and right rear wheels 27 and 29 through left and right axle shafts 23 and 25.

The propeller shaft 5 is interlockingly coupled to an output shaft 35 of a transfer unit 33 through a constant velocity joint 31. The output shaft 35 is arranged to interlock with bevel gears 37 and 39, a transmission shaft 41, and spur gears 43 and 45 inside the transfer unit 33. The spur gear 45 is arranged to interlock with a differential case 49 of a front differential gear 47.

An output of an engine 53 serving as an internal combustion engine is adapted to be inputted to a ring gear 51 of the front differential gear 47. The front differential gear 47 is interlockingly coupled to left and right front wheels 61 and 63 through left and right axle shafts 57 and 59.

Accordingly, the output torque of the engine 53 is transmitted from the transmission 55 to the ring gear 49 of the front differential gear 47, and is transmitted from the front differential gear 47 to the left and right front wheels 61 and 63 through the left and right axle shafts 57 and 59.

In addition, the torque is transmitted from the differential case 49 of the front differential gear 47 to the propeller shaft 5 through the spur gears 45 and 43, the transmission shaft 41, the bevel gears 39 and 37, and the output shaft 35 of the transfer unit 33. The torque is transmitted from the propeller shaft 5 to the rotating shaft of the rotatively driving apparatus 1.

If the rotatively driving apparatus is in a torque transmittable state, the torque is transmitted from the drive pinion shaft 13 to the ring gear 21 of the rear differential gear 3 through the drive pinion gear 17. The torque is transmitted from the rear differential gear 3 to the left and right rear wheels 27 and 29 through the left and right axle shafts 23 and 25.

Accordingly, the front wheels 61 and 63 as the main driving wheels receive the input of torque from the engine 53, and the rear wheels 27 and 29 as the auxiliary driving wheels receive the transmitted torque from the engine 53 through the control of the rotatively driving apparatus 1. As a result of these, running can be performed by the four-wheel drive based on the front and rear wheels 61, 63, 27, and 29 or by the two-wheel drive based on only the front wheels 61 and 63.

The details of the rotatively driving apparatus 1 and its periphery are shown in FIGS. 2 and 3.

The carrier cover 7 for accommodating and disposing the rotatively driving apparatus 1 is formed into a stepped and substantially cylindrical shape consisting of a large-diameter portion 71 and a small-diameter portion 73. The carrier cover 7 at its large-diameter portion 71 is detachably mounted on the differential carrier 9 by means of bolts and nuts or the like.

The rotatively driving apparatus 1 has a differential rotation amplification mechanism 65, a rotor 67, and a rotation controlling mechanism 69 in addition to the rotating shaft 11 and the drive pinion shaft 13.

The rotating shaft 11 is rotatably supported by the small-diameter portion 73 of the carrier cover 7 by means of a ball bearing 75. A flange member 77 is attached to the rotating shaft 11 at its end portion outside the carrier cover 7 by spline engagement. The flange member 77 is fixed to the rotating shaft 11 by a nut 79. A seal 81 is provided between the flange member 77 and the small-diameter portion 73 of the carrier cover 7. A bearing hole 82 is provided in the rotating shaft 11 at its end portion inside the carrier cover 7.

The differential carrier 9 is provided with a partition wall 83, and a bearing housing 85 is integrally provided on the partition wall 83 as a bearing supporting portion. The bearing housing 85 projects from the partition wall 83 into the large-diameter portion 71 of the carrier cover 7.

The drive pinion shaft 13 is rotatably supported by the bearing housing 85 by means of tapered roller bearings 87 and 89. A spacer 91 is interposed between the tapered roller bearings 87 and 89. A nut is fastened on the drive pinion shaft 13 on the tapered roller bearing 87 side, and the tapered roller bearings 87 and 89 are fastened in between the nut 93 and the drive pinion gear 17 to impart a preload.

An end portion 95 of the drive pinion shaft 13 is rotatably fitted in the shaft hole 82 of the rotating shaft 11. As the end portion 95 and the shaft hole 82 are fitted, the rotating shaft 11 and the drive pinion shaft 13 are supported in an interlocking manner.

The differential rotation amplification mechanism 65 is constituted by a multiplying gear mechanism. The differential rotation amplification mechanism 65 amplifies the differential rotation between the two members of the rotating shaft 11 and the drive pinion shaft 13, and consists of a pair of gears 97 and 99 (a first gear 97 and a second gear 99), pinion gears 101, and a carrier 103.

The gears 97 and 99 are respectively provided on the rotating shaft 11 and the drive pinion shaft 13, i.e., the two members, and are formed with slightly different numbers of teeth. In this embodiment, the numbers of teeth differ by 1, for example. The gear 97 is integrally provided on the end portion of the rotating shaft 11. The gear 99 is mounted on the end portion 95 side of the drive pinion shaft 13 by spline engagement.

The pinion gear 101 meshes with both gears 97 and 99, and are provided along outer peripheries of the gears 97 and 99 at predetermined intervals.

The carrier 103 consists of a pair of carrier plates 105 and 107 with the pinion gear 101 located therebetween, as well as carrier pins 109 whose both ends are fixed to the carrier plates 105 and 107. The carrier pins 109 are provided for the respective pinion gears 101, and are respectively passed through axial portions of the pinion gears 101 to rotatably support the pinion gears 101.

The rotor 67 is disposed on the outer periphery of the bearing housing 85 and is rotatably supported by a ball bearing 111 and a needle bearing 113 serving as bearings. The rotor 67 is coupled to one carrier plate 107 of the differential rotation amplification mechanism 65 by means of a coupling portion 115. The coupling portion 115 is formed in a circumferential form. However, as the coupling portion 115, a plurality of coupling portions may be formed in the circumferential direction at predetermined intervals.

The rotation controlling mechanism 69 has a stator 117, a variable resistor 119 serving as an energy absorbing device, and a controller 121.

The stator 117 is fixed to an inner periphery of the carrier cover 7 and constitutes an electric motor 123 together with the rotor 67. The electric motor 123 which is thus constructed by the rotor 67 and the stator 117 is disposed effectively without a strain in a space portion formed between the bearing housing 85 and the carrier cover 7. The arrangement provided is such that the differential rotation amplification mechanism 65 is disposed adjacent to this electric motor 123 without a strain. The differential rotation amplification mechanism 65 and the electric motor 123 as a whole are effectively accommodated and disposed in the large-diameter portion 71 of the carrier cover 7. Namely, the arrangement provided is such that the differential rotation amplification mechanism 65 and the rotor 67 are disposed in an identical case, e.g., the carrier cover 7 (the casing 7). Accordingly, by commonly using the space inside the carrier cover 7, the apparatus as a whole can be formed compactly. In addition, the differential rotation amplification mechanism 65 and the rotor 67, including the carrier cover 7, can be easily formed into a unit, thereby making it possible to improve the assembling efficiency. Since the differential rotation amplification mechanism 65 and the rotor 67 can be disposed in the space inside the carrier cover 7, the assembling efficiency improves, and the heat generated from the differential rotation amplification mechanism 65 and the rotor 67 and its periphery can be released to the outside from the carrier cover 7, thereby improving the cooling efficiency.

It should be noted that, as for the electric motor 123 disposed inside the carrier cover 7, the characteristics of the electric motor 123 are stabilized if the space is further partitioned by providing a seal member with respect to the carrier cover 7 with which the ball bearing 111 itself and the coupling portion 115 of the differential rotation amplification mechanism 65 undergo relative rotation together with the partition wall 83 and the large-diameter portion 71. In this case, a common lubricating oil environment can be created I the accommodating space of the differential rotation amplification mechanism 65 and the space of the differential carrier 9 are communicated with each other by a communicating hole formed in the differential carrier 9.

The variable resistor 119 is supported by the vehicle body side outside the carrier cover 7. The electric energy replacing the electric energy by the variable resistor 119 is adapted to be released to the outside to promote cooling by such as the wind during running. Accordingly, the arrangement provided is such that the variable resistor 119 in accordance with its resistance value absorbs the electric energy generated by the electric motor 123 by the rotation of the rotor 67.

The controller 121 variably controls the resistance value of the variable resistor 119 to adjust its absorbed energy, thereby controlling the transmitted torque between the rotating shaft 11 and the drive pinion shaft 13 which are the two members.

Next, a description will be given of the operation. During straight-ahead driving, the torque is transmitted from the engine 53 of the front wheels 61 and 63 in the above-described manner, and the torque is transmitted to the rotating shaft 11 by means of the propeller shaft 5. In addition, in conjunction with the drive running by the front wheels 61 and 63, the rotation is also transmitted from the rear wheels 27 and 29 side to the drive pinion shaft 13 through the axle shafts 23 and 25, the rear differential gear 3, the ring gear 21, and the drive pinion gear 17.

The pinion gear 101 is rotated in the reverse direction by the rotation of the rotating shaft 11 and the drive pinion shaft 13. As the result of the rotation of the pinion gear 101, the rotor 67 is rotated in the opposite direction to the gears 97 and 99 by means of the carrier cover 107 of the carrier 103 and the coupling portion 115. In this case, by the setting of the gear ratio of the gears 97 and 99, the pinion gear 101, the drive pinion gear 17, and the ring gear 21, adjustment is made so that the rotor 67 does not relatively rotate with respect to the stator 117.

Namely, during straight-ahead driving, the small relative rotation between the gears 97 and 99 is absorbed by the rotation of the pinion gear 101, so that the rotor 67 does not relatively rotate relative to the stator 117, and power generating action of the electric motor 123 does not occur. Accordingly, the torque is not transmitted from the gear 97 to the gear 99, so that during straight-ahead driving it is possible to perform two-wheel drive running by the front wheels 61 and 63.

During cornering, driving on a rough road, or the like, if a differential rotation of a fixed level or more occurs between the front wheels 61 and 63 and the rear wheels 27 and 29, this differential rotation is transmitted between the rotating shaft 11 and the drive pinion shaft 13. As the result of this differential rotation, the pinion gear 101 rotates at high speed between the gears 97 and 99, and the rotor 67 relatively rotates with respect to the stator 117 through the carrier cover 107 of the carrier 103 and the coupling portion 115. An induced electromotive force is generated in correspondence with the relative rotation of the rotor 67 with respect to this stator 117, so that the rotor 67 is subjected to braking action.

As the result of the braking action with respect to the rotor 67, a torque corresponding to the braking force is transmitted from the gear 97 to the gear 99 through the rotation of the pinion gear 101. At this time, the braking force of the rotor 67 can be changed by the adjustment of the resistance value of the variable resistance in the variable resistor 119 by the controller 121.

When the resistance of the variable resistor 119 has been adjusted to a large level, a large amount of electric energy can be converted into thermal energy by the variable resistor 119 and can be released to the outside. Therefore, the braking action by the rotor 67 is made small correspondingly, and the torque transmitted from the gear 97 to the gear 99 is made small correspondingly.

Namely, the torque transmitted from the rotating shaft 11 to the drive pinion shaft 13 is transmitted in accordance with the differential rotation and the reciprocal of the resistance value in the variable resistor 119. As the result of this torque transmission, it is possible to obtain characteristics of torque transmitted to the rear wheels 27 and 29, such as those shown in FIG. 4. The vehicle can be made to run in the state of four-wheel drive by the front wheels 61 and 63 and the rear wheels 27 and 29 in correspondence with the amount of this torque transmitted to the rear wheels 29 and 29.

Accordingly, cornering can be performed stably, and drivability in driving on rough roads can be improved.

During a sudden start, the torque is quickly transmitted from the rotating shaft 11 to the rotor 67 through the pinion gear 101 and the carrier 103. At this time, by virtue of the inertia of the rotor 67, the rotor 67 is set in a state similar to that of having been subjected to braking action, and the torque is transmitted from the gear 97 to the gear 99 in the same way as described above. Thus, the sudden start can be effected smoothly by the torque transmission to the rear wheels 27 and 29.

As described above, in this embodiment, since the arrangement provided is such that the differential rotation amplification mechanism 65 and the rotor 67 are disposed on the same axis, the apparatus as a whole can be formed compactly, and the weight balance can be made satisfactory.

Since the differential rotation amplification mechanism 65 is constructed by the multiplying gear mechanism, the differential rotation amplification mechanism 65 can easily be disposed adjacent to the rotor 67 in a direction parallel to the axis of rotation while being made compact, and the differential rotation can be transmitted from the differential rotation amplification mechanism 65 to the rotor 67 without a strain.

Since the rotor 67 is rotatably supported on the outer periphery of the bearing housing 85 by means of the ball bearing 111 and the needle bearing 113, the rotor 67 can be supported reliably, and control of the rotation of the rotor 67 by the rotation controlling mechanism 69 can be effected accurately.

Since the electric motor 123 is accommodated in the space portion between the bearing housing 85 and the carrier cover 7, the electric motor 123 can be disposed without a strain effectively in terms of space.

The energy absorbed by the variable resistor 119 can be adjusted by the controller 121, making it possible to control the transmitted torque between the rotating shaft 11 and the drive pinion shaft 13.

Since the stator 117 is fixed in an inner peripheral side of the carrier cover 7, number of parts is reduced, and an assembling efficiency is improved. Furthermore, a cooling efficiency of the rotatively driving apparatus 1 during a driving of the vehicle is improved. As a result, it contributes to a stabilization of a characteristics of a drive system of the vehicle.

Further, explained herein are some methods for actively controlling a vehicle running condition by controlling the resistance value in the variable resistor 119 by the controller 121 in accordance with various detected signals inputted to the controller 121. According to these simple but important controlling methods, it is possible to smoothly start and accelerate the vehicle, and to drive the vehicle in a stable running attitude. In a first method, a front side rotation speed (that is, a rotation speed of the propeller shaft 5) is detected from a rotation speed of the front side wheels 61, 63, and a rear side rotation speed (that is, a rotation speed of the drive pinion 13) is detected form a rotational speed of the rear side wheels 27, 29. The controller 121 compares the front side rotation speed and the rear side rotation speed and performs a calculation. When it is needed to apply a straight running ability or an over-sheer characteristics to the vehicle, the controller 121 outputs a signal to the variable resister 119 so as to vary the resistance value, so that the driving torque to the rear wheels 27, 29 is increased. A volume of the resistance value of the variable resister 119 is determined in accordance with a direction and an amount of a yaw moment. In this method the yaw moment is calculated by a rotational speeds of the front and rear wheels, it is possible to detect the yaw moment from a yaw sensor on the vehicle. In a second method, a rotation speed of the engine 55, the rotation speed of the wheels 27, 29, 61, 63, the vehicle speed or the like is detected, and a determination is carried out in the controller 121 whether the vehicle is in a starting state. When it is determined that the vehicle is in the starting state, the controller outputs a signal to the variable resister 119 in order to vary the resistance value so that the driving torque to the rear wheels 27, 29 is increased and the vehicle becomes in four-wheel driving state. Thereby, a slip of each wheels 27, 29, 61, 63 is restrained, and the vehicle can smoothly start and be accelerated. The volume of the resistance value of the variable resister 119 is varied by the controller 121, observing a transition condition from zero to a predetermined vehicle speed based on a speed sensor provided on the front differential gear 47 or the like, or based on an acceleration sensor mounted to a vehicle body side, and the controller 121 outputs the signal to vary the volume of the resistance value in accordance with the transition condition. (For example, the volume of the resistance value is set maximum when the vehicle speed is zero, and the volume of the resistance value is decreased or set minimum when the vehicle speed is reached to the predetermined vehicle speed.) Further, the volume of the resistance value can be varied from a minimum side to a maximum side.

Further, it is possible to use the electric motor 123 as a generator, so as to convert and regenerate the rotational resistance to be an electric power, and to charge the regenerated electric power into a battery. Moreover, it is possible to use the electric motor 123 as a power source to apply driving torque to the front and rear wheels 27, 29, 61, 63, so that a vehicle attitude can be actively controlled.

Second Embodiment

Figure 5:
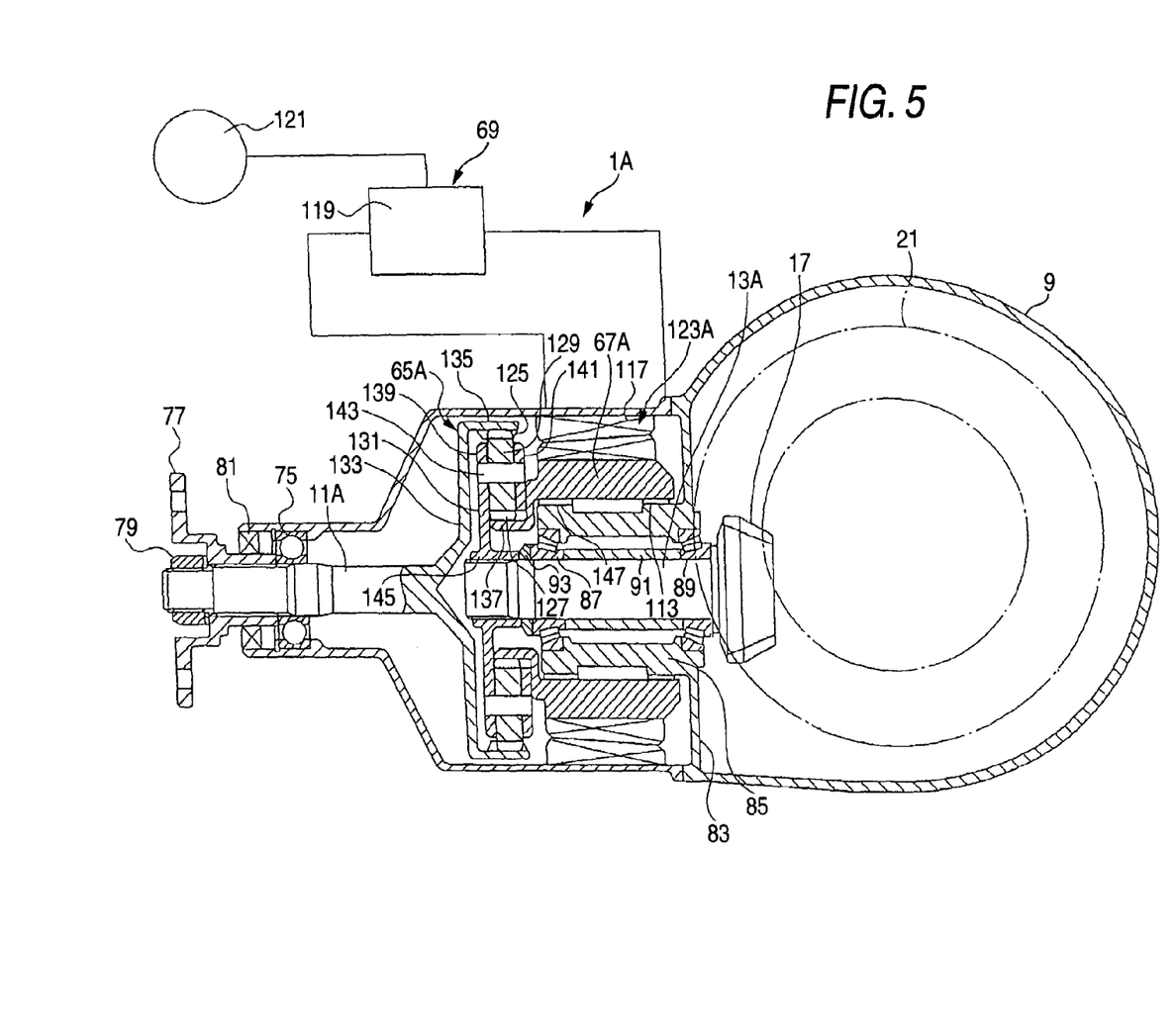
FIG. 5 is a cross-sectional view illustrating the rotatively driving apparatus and its periphery (second embodiment)
Figure 6:
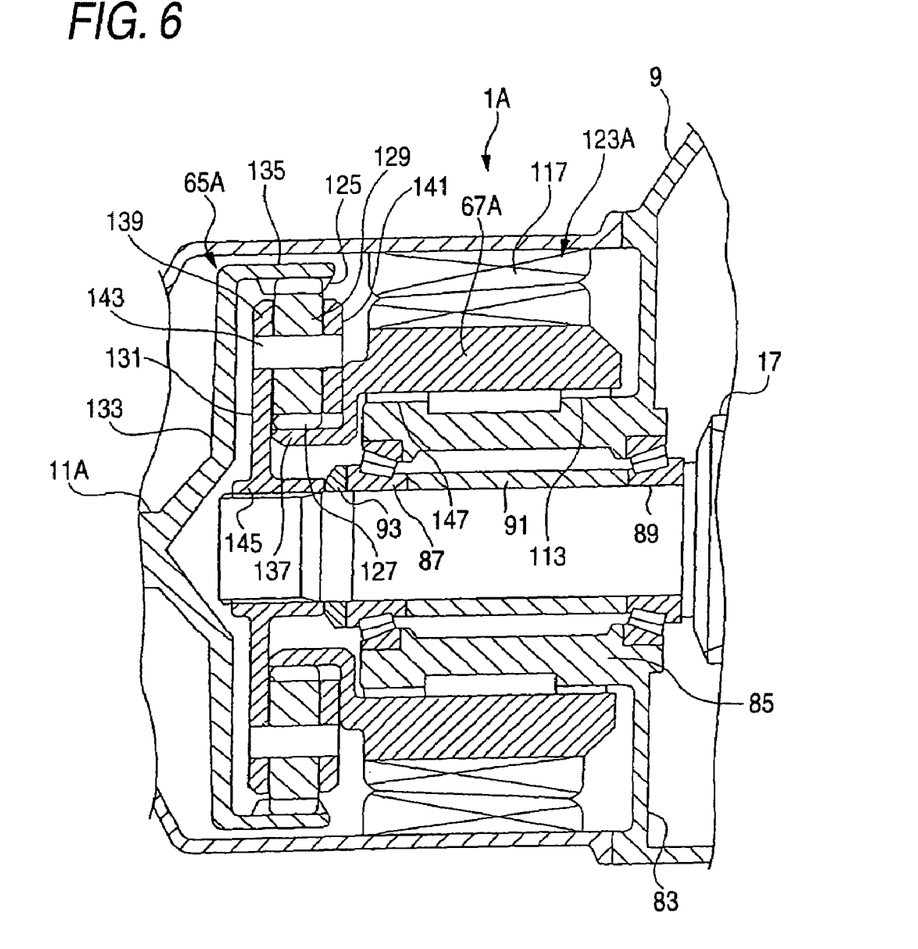
FIG. 6 is an enlarged cross-sectional view of essential portions (second embodiment)

FIGS. 5 and 6 are diagrams illustrating a second embodiment of the invention, in which FIG. 5 is an enlarged cross-sectional view illustrating the rotatively driving apparatus and its periphery, and FIG. 6 is an enlarged cross-sectional view of essential portions. It should be noted that a description will be given by denoting component portions corresponding to those of the first embodiment by the same reference numerals.

In this embodiment, a differential rotation amplification mechanism 65A of a rotatively driving apparatus 1a is constructed by a planetary gear mechanism. Namely, the differential rotation amplification mechanism 65A consists of an internal gear 125, a sun gear 127, planetary gears 129, and a carrier 131.

The internal gear 125 is provided on a cylinder portion 135. The cylinder portion 135 is provided on an outer periphery of a flange portion 133 provided on an end portion of the rotating shaft 11. The sun gear 127 is provided on an inner cylinder portion 137 provided on a rotor 67A. The inner cylinder portion 137 and the outer cylinder portion 135 are opposed to each other on radially outer and inner sides.

The planetary gears 129 are provided circumferentially between the internal gear 125 and the sun gear 127, and mesh with both gears 125 and 127. The planetary gears 129 are rotatably supported by the carrier 131. The carrier 131 is constructed by fixing carrier pins 143 to carrier plates 139 and 141. The respective planetary gears 129 are rotatably supported by these carrier pins 143. One carrier plate 139 of the carrier 131 extends on the inner peripheral side, and its boss portion 145 is spline engaged with an end portion of a drive pinion shaft 13A.

It should be noted that the bearings for rotatably supporting the rotor 67A on the outer peripheral surface of the bearing housing 85 differ from those of the first embodiment, and both of them are constituted by needle bearings 147 and 113. The end portion of the drive pinion shaft 13A is not fitted to an end portion of a rotating shaft 11A. The space for disposing an electric motor 123A can be partitioned in the same way as in the first embodiment by interposing a seal member between the relatively rotating portions.

In addition, in this embodiment as well, by the setting of the gear ratio of the internal gear 125, the sun gear 127, the planetary gears 129, the drive pinion gear 17, and the ring gear 21, the rotor 67A does not relatively rotate with respect to the stator 117 during straight-ahead driving. Accordingly, in the same way as in the first embodiment, during straight-ahead driving the rotor 67A is not subjected to braking action, and the torque is not transmitted from the rotating shaft 11A to the drive pinion shaft 13A.

When differential rotation occurs between the rotating shaft 11A and the drive pinion shaft 13A, the planetary gears 129 rotate about the carrier pins 143 at a higher speed, and the rotor 67A relatively rotates with respect to the stator 117 through the sun gear 127 owing to this rotation. As the result of this relative rotation, an induced electromotive force is generated in the electric motor 123A in the same way as described above, so that the rotor 67A is subjected to braking action.

Accordingly, in this embodiment as well, it is possible to demonstrate operation and effects substantially similar to those of the first embodiment.

Since the differential rotation amplification mechanism 65A is constructed by the planetary gear mechanism, the differential rotation amplification mechanism 65A can easily be disposed adjacent to the rotor 67A in a direction parallel to the axis of rotation while being made compact.

Further, it is possible to use the electric motor 123A as a generator, so as to convert and regenerate the rotational resistance to be an electric power, and to charge the regenerated electric power into a battery. Moreover, it is possible to use the electric motor 123A as a power source to apply driving torque to the front and rear wheels 27, 29, 61, 63, so that a vehicle attitude can be actively controlled.

Third Embodiment

Figure 7:
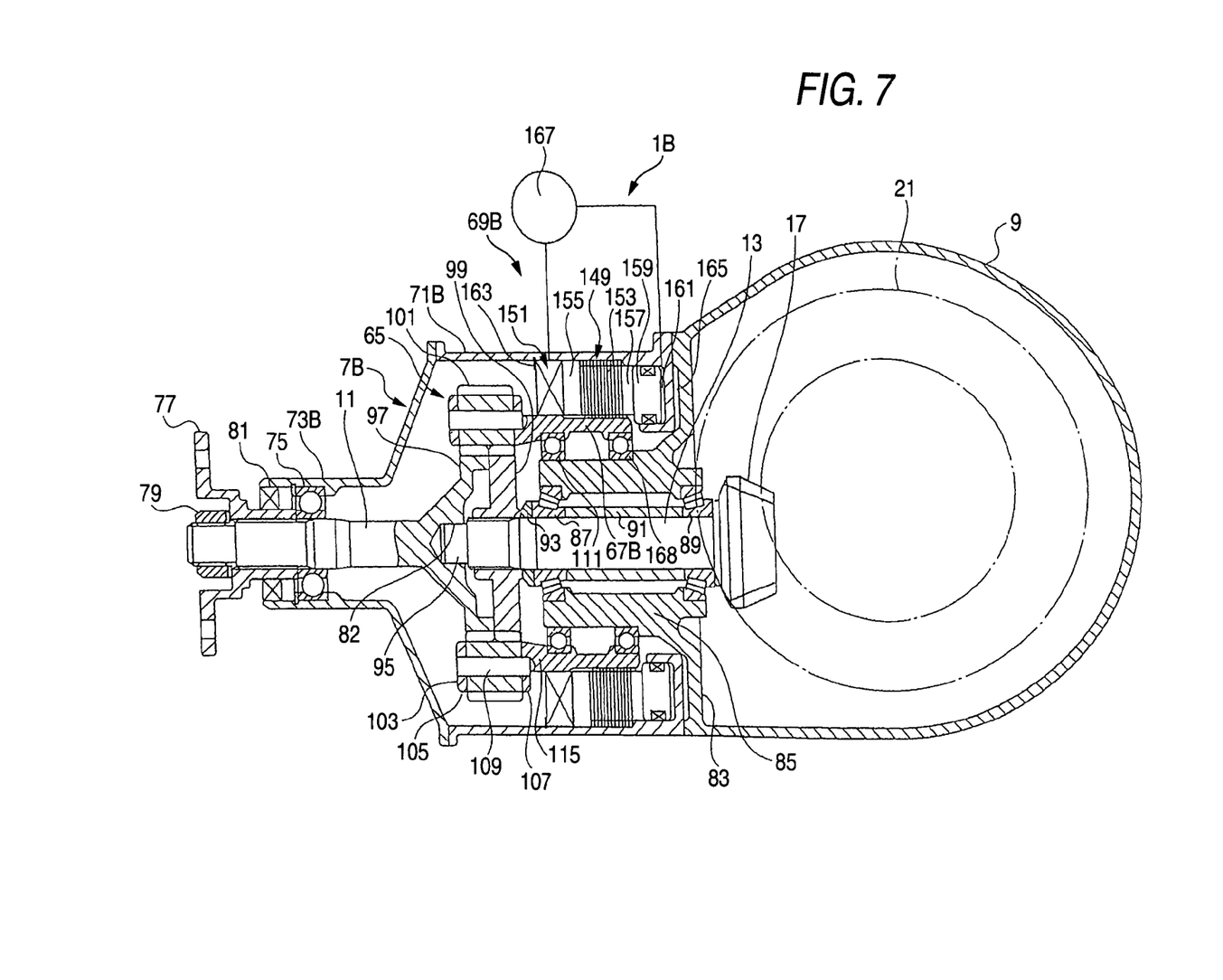
FIG. 7 is an enlarged cross-sectional view illustrating the rotatively driving apparatus and its periphery (third embodiment)
Figure 8:
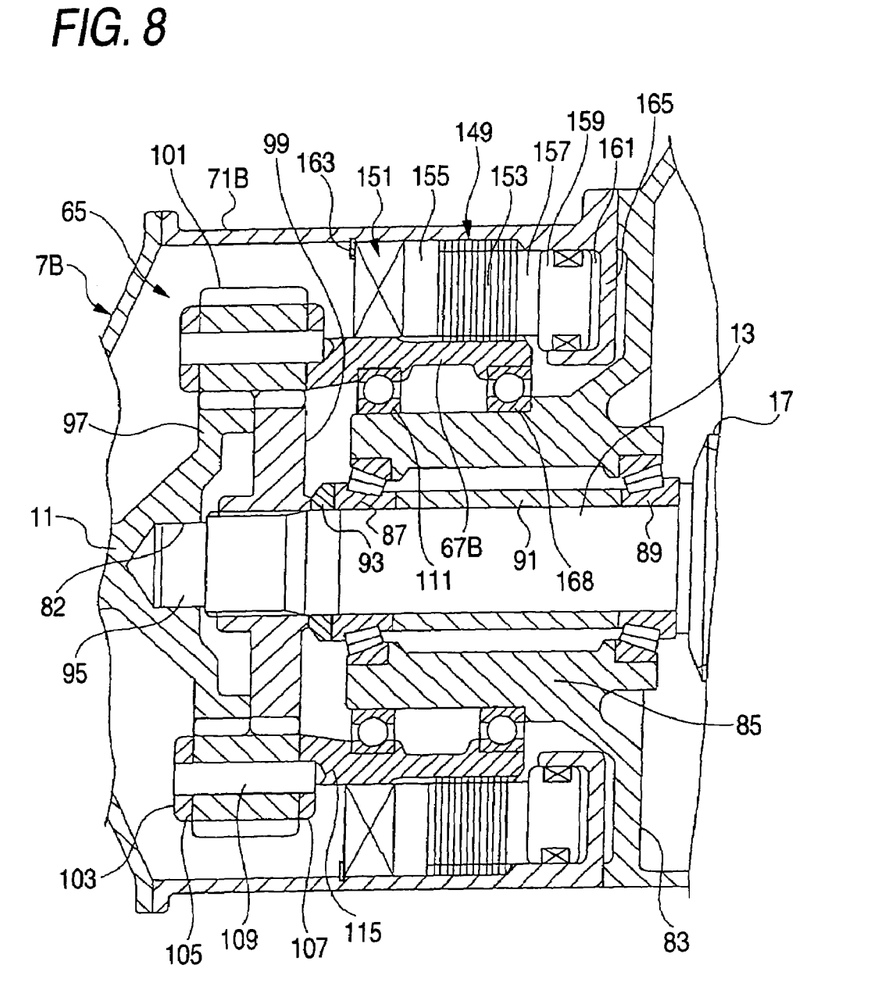
FIG. 8 is an enlarged cross-sectional view of essential portions (third embodiment)

FIGS. 7 and 8 are diagrams illustrating a third embodiment of the invention, in which FIG. 7 is an enlarged cross-sectional view illustrating the rotatively driving apparatus and its periphery, and FIG. 8 is an enlarged cross-sectional view of essential portions. It should be noted that a description will be given by denoting component portions corresponding to those of the first embodiment by the same reference numerals.

In this embodiment, a rotation controlling mechanism 69B using a friction plate is used. Namely, the rotation controlling mechanism 69B has a fastening portion 149 and a pump portion 151 (an actuator 151).

The fastening portion 149 is provided between a rotor 67B and a large-diameter portion 71B of a carrier cover 7B (a casing 7B), i.e., the fixed side, and limits the rotation of the rotor 67B with respect to the large-diameter portion 71B by fastening. Namely, the fastening portion 149 has a multiple disk friction clutch 153, a pressure receiving plate 155, a pressing plate 157, a pressing piston 159, and a pressure chamber 161.

As for the multiple disk friction clutch 153, its outer plate is spline engaged with the inner peripheral surface of the large-diameter portion 71B, and its inner plate is spline engaged with the outer peripheral surface of the rotor 67B. This multiple disk friction clutch 153 is disposed in such a manner as to be clamped by the pressure receiving plate 155 and the pressing plate 157. The pressure receiving plate 155 is positioned in a direction parallel to the axis of rotation by a stopper ring 163 for positioning the pump portion 151, and is adapted to receive a pressing force.

The pressing piston 159 is disposed adjacent to the pressing plate 157, is fitted in a cylinder portion 165 provided in an end portion of the large-diameter portion 71B, and forms the pressure chamber 161.

The pump portion 151 is provided between the rotor 67B and the large-diameter portion 71B, and is arranged such that, for example, a piston urged by a coil spring radially abuts against a cam surface provided circumferentially on the outer peripheral surface of the rotor 67B. Accordingly, when the rotor 67B rotates, the piston is reciprocated by the cam surface, so that oil in the carrier cover 7B is pressure fed.

An accumulator 167 is connected to the pump portion 151, and the accumulator 167 is connected to the pressure chamber 161. Accordingly, the oil which has been pressure fed by the pump portion 151 is pressure fed to the accumulator where the pressure is accumulated, and the oil is pressure fed from the accumulator 167 to the pressure chamber 161.

It should be noted that the bearings for rotatably supporting the rotor 67B on the outer peripheral surface of the bearing housing 85 differ from those of the first embodiment, and both of them are constituted by ball bearings 111 and 168. The end portion of the drive pinion shaft 13A is not fitted to an end portion of a rotating shaft 11A. The carrier cover 7B is one in which the large-diameter portion 71B and a small-diameter portion 73B are formed separately and are detachably coupled to each other by means of bolts and nuts or the like.

When differential rotation occurs between the rotating shaft 11 and the drive pinion shaft 13, and the rotor 67B starts to rotate with respect to the large-diameter portion 71B, the oil in the carrier cover 7B is pressure fed to the pressure chamber 161 through the accumulator 167 by the operation of the pump chamber 151. As the result of the pressure feeding of the oil, the pressing piston 159 moves, and the multiple disk friction clutch 153 receives a pressing force through the pressing plate 157. This pressing force is transmitted to the pressure receiving plate 155. The pressure receiving plate 155 is supported y the stopper ring 163 through the pump portion 151, and the multiple disk friction clutch 153 is fastened between the pressing plate 157 and the pressure receiving plate 155.

As the result of the fastening of this multiple disk friction clutch 153, the rotor 67B is subjected to braking action, and the torque is transmitted from the rotating shaft 11 to the drive pinion shaft 13 in the same way as described above.

The greater the differential rotation between the rotating shaft 11 and the drive pinion shaft 13, the faster the rotation of the rotor 67B with respect to the large-diameter portion 71B, and the pump portion 151 is operated correspondingly, so that the pressure within the pressure chamber 161 becomes high. Accordingly, higher torque can be transmitted from the rotating shaft 11 to the drive pinion shaft 13 in correspondence with the differential rotation.

Thus, in this embodiment as well, it is possible to demonstrate operation and effects substantially similar to those of the above-described embodiments.

In addition, in this embodiment, hydraulic pressure is generated by the pump portion 151 which is operated in correspondence with the rotation of the rotor 67B. As the fastening portion 149 is fastened by this hydraulic pressure, the torque can be transmitted between the rotating shaft 11 and the drive pinion shaft 13.

Further, in this embodiment, as the actuator 151 for generating pressure to fasten the fastening portion 149, the following mechanisms or the like may be used, instead of the pump to generating hydraulic pressure: A first mechanism is structured by a ring shaped electromagnetic coil and ring shaped friction plates, both coaxially disposed with the rotor 67B, wherein the electromagnetic coil pushes and pulls the friction plates so as to be fastened. A second mechanism is structured by ring shaped friction plates coaxially disposed with the rotor 67B and a electric motor disposed having another rotational axis with the rotor 67B, wherein the electric motor drive the friction plates to be pushed and pulled so as to be fastened.

Fourth Embodiment

Figure 9:
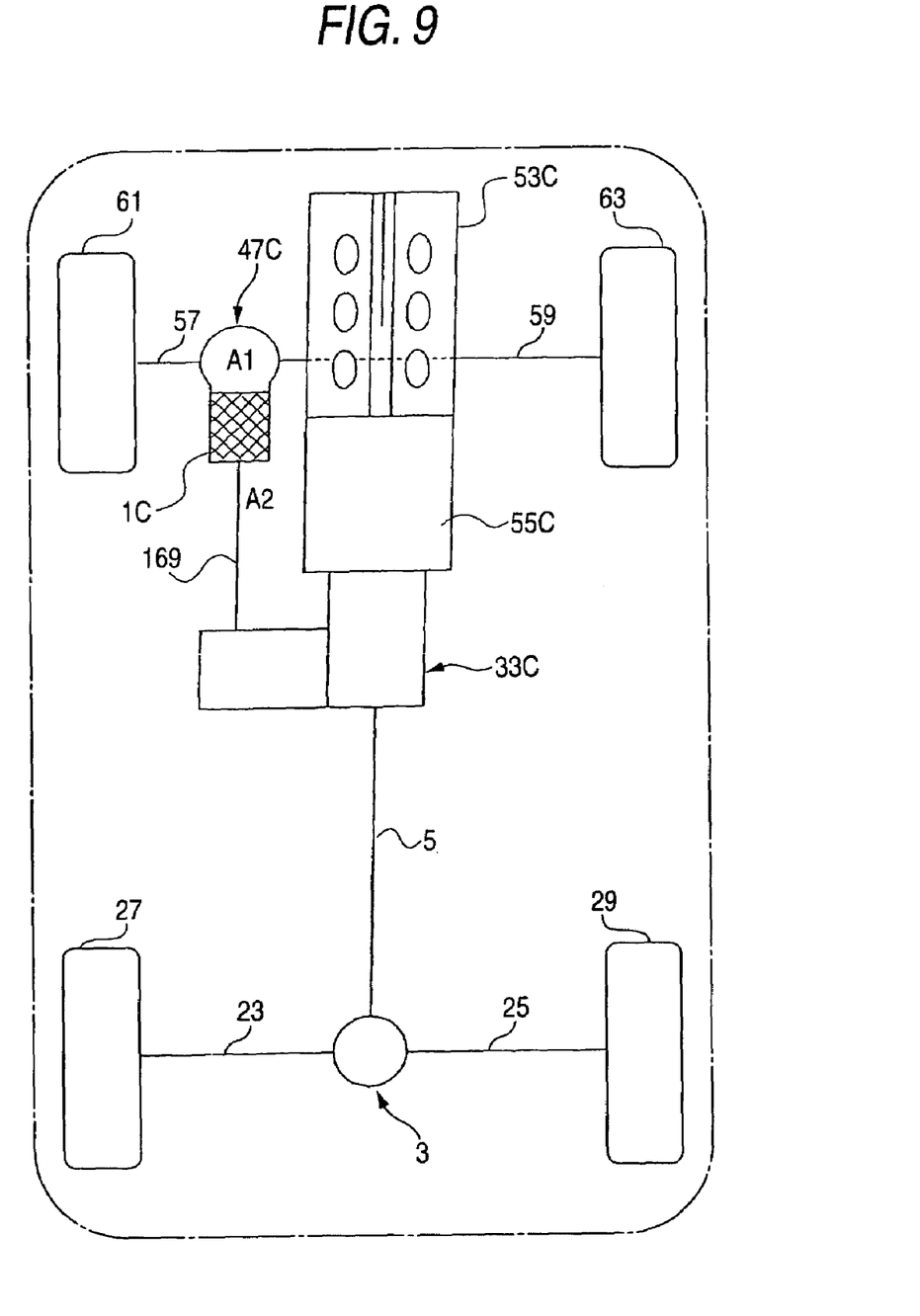
FIG. 9 is a skeleton plan view of a four-wheel drive vehicle (fourth embodiment)

FIG. 9 is a skeleton plan view of a four-wheel drive vehicle. The four-wheel drive vehicle shown in FIG. 9 is a four-wheel drive vehicle of a front-engine rear-drive base (FR base). In this embodiment, through a vertical engine 53C, a transmission 55C, and a transfer unit 33C, on the one hand, the torque is transmitted from a front-side propeller shaft 169 to a rotating shaft of a rotatively driving apparatus 1C, while, on the other hand, the torque is transmitted to the propeller shaft 5. The torque is transmitted from the propeller shaft 5 to the left and right rear wheels 27 and 29 by means of the left and right axle shafts 23 and 25.

The rotatively driving apparatus 1C is constructed in the same way as in the first embodiment, for example, and the arrangement provided is such that the drive pinion shaft, which constitutes the two members together with the rotating shaft, meshes with a ring gear of a front differential gear 47C.

When differential rotation occurs between the rotation A1 of the drive pinion shaft and the rotation A2 of the rotating shaft, the rotatively driving apparatus 1C transmits the torque in the same way as described above, and the torque is transmitted to the front wheels 61 and 63.

Accordingly, in this embodiment, during straight-ahead driving, the vehicle is able to run in the state of two-wheel drive by the rear wheels 27 and 29. When differential rotation has occurred between the front wheels 61 and 63 and the rear wheels 27 and 29 during cornering or driving on a rough road, the vehicle is able to run in the state of four-wheel drive by transmitting the torque to the front wheels 61 and 63 in correspondence with the magnitude of the differential rotation.

Further, the rotatively driving apparatus 1C may be installed in the transfer unit 33, instead of additionally arranging to an input side of the front differential gear 47C.

Figure 10:
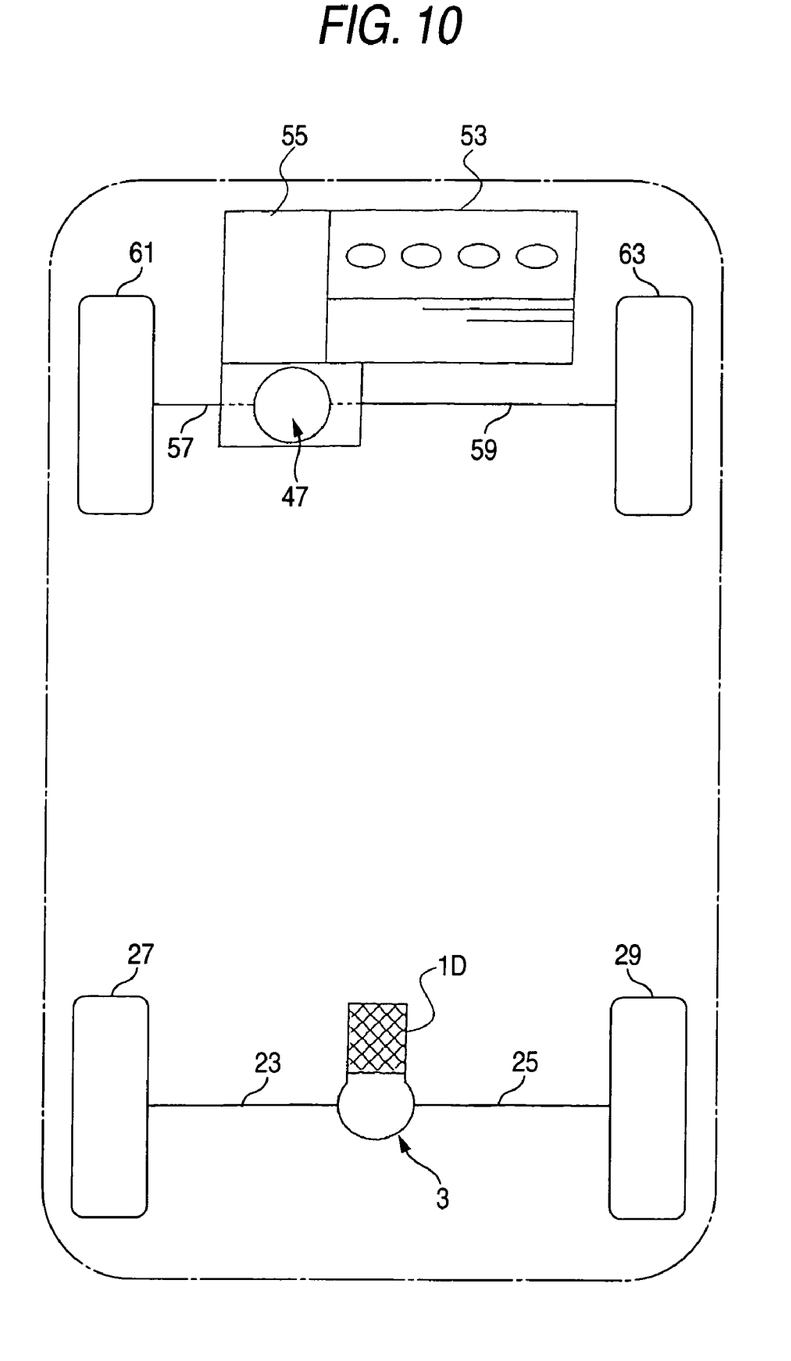
FIG. 10 is a skeleton plan view of a four-wheel drive vehicle (fifth embodiment).
Figure 11:
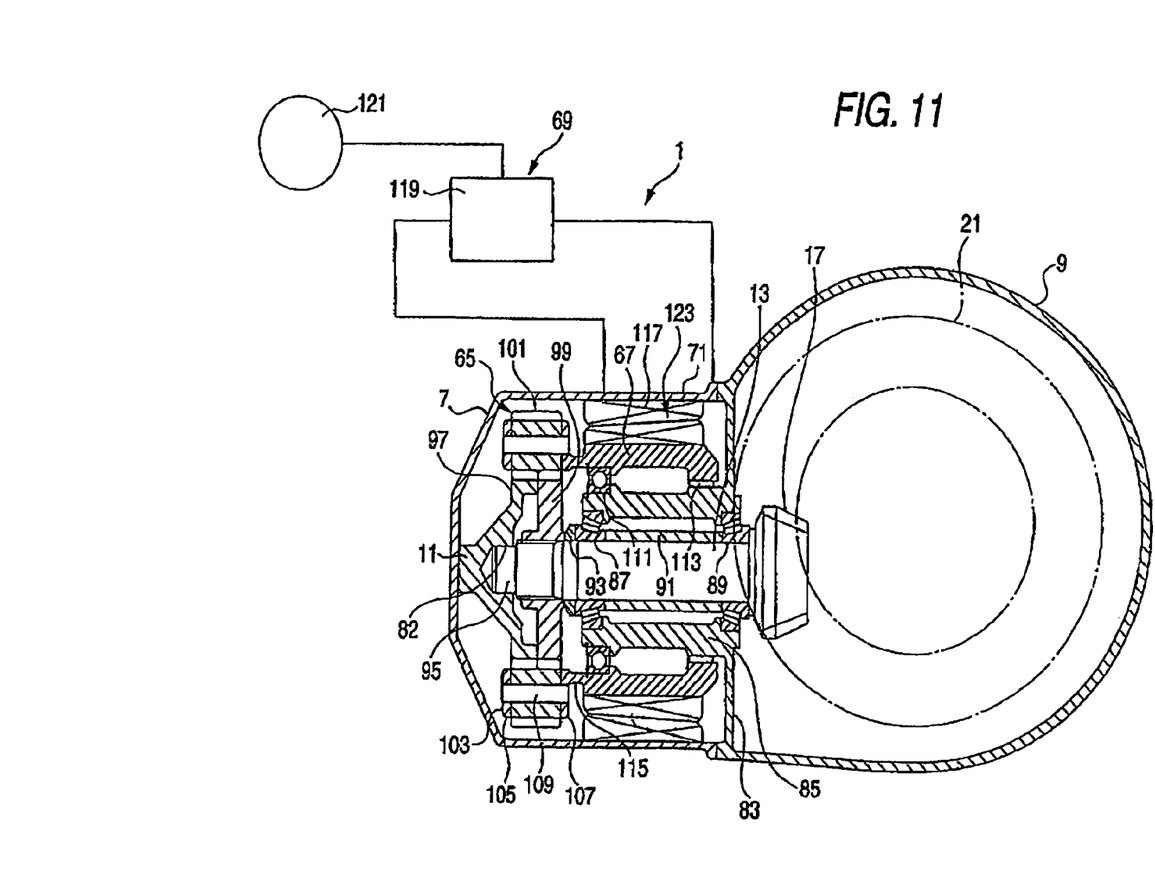
FIG. 11 is an enlarged cross-sectional view illustrating the rotatively driving apparatus and its periphery (fifth embodiment).

FIG. 10 is a skeleton plan view of a hybrid vehicle which is classified as a four-wheel drive vehicle separately having a different driving source, i.e., an electric motor, as an auxiliary driving source. A rotatively driving apparatus 1D shown in FIG. 10 is shown in FIG. 11. As shown in FIG. 11, the rotating shaft 11 is fixed to the carrier cover 7 side, and the variable resistor 119 is substituted by a battery serving as an electric source which is controlled by the controller 121.

Accordingly, as shown in FIG. 11, the rotation controlling mechanism in this case is comprised of the stator 117 for making up the electric motor 123 or 123A together with the rotor 67; the battery 119 capable of supplying electric energy to the electric motor 123; and the controller 121 for controlling the rotation of the drive pinion shaft 13, i.e., one of the two members, with respect to the fixed shaft 11, i.e., the other one which is fixed, by adjusting the electric energy supplied from the battery 119.

Apart from using the battery 119 for accumulating electric energy, the four-wheel drive vehicle may be of the type in which electric energy, which is obtained by partially branching the engine torque and converting it by a generator attached to the engine 53, is directly adjusted and supplied to the electric motor 123 through the controller.

In addition, the drive pinion shaft 13 whose rotation is controlled is arranged to transmit torque to the rear wheels 27 and 29, i.e., the auxiliary driving wheels, separately from the front wheels 61 and 63, i.e., the main driving wheels to which the torque is transmitted from the engine 53, i.e., the main driving source.

Accordingly, in this embodiment, the front wheels 61 and 63, i.e., the main driving wheels, can be driven by the engine 53, and the rear wheels 27 and 29, i.e., the auxiliary driving wheels, can be driven by the motor 123 of the rotatively driving apparatus 1D.

In addition, when the motor 123 is not driven during driving, the induced electromotive force generated can be energy regenerated by the generator.

By using such a rotatively driving apparatus in the four-wheel drive vehicle, it is possible to prevent the apparatus from becoming large in size and improve the weight balance of the vehicle.

It should be noted that in the first to fifth embodiments both the differential rotation amplification mechanism and the rotor are disposed on the same axis as that of the rotating shaft. However, in a case where both the differential rotation amplification mechanism and the rotor are accommodated and disposed in an identical case, e.g., the carrier cover, the differential rotation amplification mechanism and the rotor may be disposed on an axis parallel to the rotating shaft as another conceivable form. In this case, the differential rotation amplification mechanism and the rotor are interlockingly rotated between the two parallel axes by gears or an endless body.

Further, in the embodiments, the carrier cover 7, 7B (the casing 7, 7B) is structured by a single part, however, the carrier cover 7, 7B can be structured by two or more parts. Even if the carrier cover 7, 7B is structured by two or more parts, the two or more parts constitute one casing, and the differential rotation amplification mechanism and the rotor (and so on) are accommodated and disposed in the casing.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A rotatively driving apparatus comprising:
    a first member;
    a second member, wherein the first member and the second member are relatively rotatable;
    a differential rotation amplification mechanism for amplifying a differential rotation between the first member and the second member;
    a rotor rotatable so as to interlock with an amplified differential rotation amplified by the differential rotation amplification mechanism; and
    a rotation controlling mechanism for controlling a rotation of the rotor, wherein
        the differential rotation amplification mechanism and the rotor are disposed on an identical axis,
        the first member comprises a rotating shaft coupled to a propeller shaft that transmits a torque from a main driving source, and the second member is a drive pinion shaft rotatably supported by a bearing supporting portion in a casing, and an electric motor is disposed on an outer peripheral side of the bearing supporting portion, and
        the rotor is rotatably supported by an outer periphery of the bearing supporting portion through a bearing.

2. The rotatively driving apparatus according to claim 1, wherein the rotation controlling mechanism comprises:
    a stator for constituting the electric motor together with the rotor;
    an energy absorbing device for absorbing an electric energy generated by the electric motor by the rotation of the rotor; and
    a controller for controlling a torque transmitted between the first member and the second member by adjusting the electric energy absorbed by the energy absorbing device.

3. The rotatively driving apparatus according to claim 2, further comprising the casing, wherein the stator is fixed in an inner peripheral side of the casing.

4. The rotatively driving apparatus according to claim 1, wherein the first member and the second member are disposed in a torque transmission path to auxiliary driving wheels of a four-wheel drive vehicle that transmits a torque from a main driving source to main driving wheels and the auxiliary driving wheels, and the rotatively driving apparatus controls the transmission of the torque from the main driving source to the auxiliary driving wheels.

5. A rotatively driving apparatus comprising:
    a first member;
    a second member, wherein the first member and the second member are relatively rotatable;
    a differential rotation amplification mechanism for amplifying a differential rotation between the first member and the second member;
    a rotor rotatable so as to interlock with an amplified differential rotation amplified by the differential rotation amplification mechanism; and
    a rotation controlling mechanism for controlling a rotation of the rotor, wherein
        the differential rotation amplification mechanism and the rotor are disposed on an identical axis, and
        the differential rotation amplification mechanism comprises:
            a first gear on the first member;
            a second gear on the second member;
            a pinion gear meshing with the first gear and the second gear; and
            a carrier for rotatably supporting the pinion gear and fixed to the rotor,
        wherein an outer diameter of the first gear is substantially equal to an outer diameter of the second gear.

6. The rotatively driving apparatus according to claim 1, wherein the differential rotation amplification mechanism comprises: an internal gear provided on one of the first member and the second member; a sun gear provided on the rotor; planetary gears meshing with the internal gear and the sun gear; and a carrier for rotatably supporting the planetary gears and coupled to the other one of the first member and the second member.

7. A rotatively driving apparatus comprising:
    a first member;

a second member, wherein the first member and the second member are relatively rotatable;
a differential rotation amplification mechanism for amplifying a differential rotation between the first member and the second member;
a rotor rotatable so as to interlock with an amplified differential rotation amplified by the differential rotation amplification mechanism; and
a rotation controlling mechanism for controlling a rotation of the rotor, wherein
the differential rotation amplification mechanism and the rotor are disposed on an identical axis, and
the rotation controlling mechanism comprises:
a stator constituting an electric motor together with the rotor;
a power source capable of supplying an electric energy to the electric motor; and
a controller for controlling the rotation of one of the first member and the second member with respect to the other of the first member and the second member by adjusting the electric energy supplied from the power source, wherein the other of the first member and the second member is fixed.

8. The rotatively driving apparatus according to 1, wherein the one of the first member and second member transmits a torque to auxiliary driving wheels separately from main driving wheels to which a torque is transmitted from a main driving source.

9. A rotatively driving apparatus comprising:
a first member;
a second member, wherein the first member and the second member are relatively rotatable, and one of the first member and the second member is fixed and the other of the first member and the second member is rotatable;
a differential rotation amplification mechanism for amplifying a differential rotation between the first member and the second member;
a rotor rotatable so as to interlock with an amplified differential rotation amplified by the differential rotation amplification mechanism; and
a rotation controlling mechanism for controlling a rotation of the rotor, wherein
the differential rotation amplification mechanism and the rotor are accommodated and disposed in a casing.

10. The rotatively driving apparatus according to claim 5, wherein a number of teeth of the first gear and a number of teeth of the second gear are slightly different.

11. The rotatively driving apparatus according to claim 10, wherein the number of teeth of the first gear and the number of teeth of the second gear differ by 1.

12. The rotatively driving apparatus according to claim 5, wherein the first member comprises a rotating shaft coupled to a propeller shaft that transmits a torque from a main driving source, and the second member is a drive pinion shaft rotatably supported by a bearing supporting portion in a casing, and an electric motor is disposed on an outer peripheral side of the bearing supporting portion.

13. A rotatively driving apparatus comprising:
a first member;
a second member, wherein the first member and the second member are relatively rotatable;
a differential rotation amplification mechanism for amplifying a differential rotation between the first member and the second member;
a rotor rotatable so as to interlock with an amplified differential rotation amplified by the differential rotation amplification mechanism; and
a rotation controlling mechanism for controlling a rotation of the rotor, wherein
the differential rotation amplification mechanism and the rotor are disposed on an identical axis,
the first member comprises a rotating shaft coupled to a propeller shaft that transmits a torque from a main driving source, and the second member is a drive pinion shaft rotatably supported by a bearing supporting portion in a casing, and
the rotor is rotatably supported by an outer periphery of the bearing supporting portion though a bearing.

14. The rotatively driving apparatus according to claim 13, wherein the rotation controlling mechanism comprises:
a fastening portion for limiting the rotation of the rotor by a fastening force; and
an actuator for generating the fastening force.

15. The rotatively driving apparatus according to claim 14, wherein the actuator comprises a pump portion operated in correspondence with the rotation of the rotor and generates hydraulic pressure.

16. The rotatively driving apparatus according to claim 13, wherein the differential rotation amplification mechanism comprises:
an internal gear provided on one of the first member and the second member;
a sun gear provided on the rotor;
planetary gears meshing with the internal gear and the sun gear; and
a cater for rotatably supporting the planetary gears and coupled to the other one of the first member and the second member.

* * * * *